(12) United States Patent
Luo et al.

(10) Patent No.: US 10,069,381 B2
(45) Date of Patent: Sep. 4, 2018

(54) MOTOR AND ACTUATOR

(71) Applicant: Johnson Electric S.A., Murten (CH)

(72) Inventors: Qing Bin Luo, Shenzhen (CN); James Ching Sik Lau, Hong Kong (CN); Wen Ming Wu, Shenzhen (CN); Gui Hong Tian, Shenzhen (CN); Xin Peng Wei, Shenzhen (CN); Wing Cheung Lam, Hong Kong (CN); Qiang Xu, Shenzhen (CN); Zhong Hai Chen, Shenzhen (CN)

(73) Assignee: JOHNSON ELECTRIC S.A, Murten (CH)

( * ) Notice: Subject to any disclaimer, the term of this patent is extended or adjusted under 35 U.S.C. 154(b) by 494 days.

(21) Appl. No.: 14/734,275

(22) Filed: Jun. 9, 2015

(65) Prior Publication Data

US 2015/0357884 A1 Dec. 10, 2015

(30) Foreign Application Priority Data

Jun. 9, 2014 (CN) .......................... 2014 1 0252289

(51) Int. Cl.

| | |
|---|---|
| *H02K 11/00* | (2016.01) |
| *H02K 11/026* | (2016.01) |
| *H02K 5/04* | (2006.01) |
| *H02K 7/116* | (2006.01) |
| *H02K 11/01* | (2016.01) |
| *H02K 7/00* | (2006.01) |
| *H02K 11/22* | (2016.01) |
| *H02K 11/40* | (2016.01) |

(52) U.S. Cl.
CPC ........... *H02K 11/0005* (2013.01); *H02K 5/04* (2013.01); *H02K 7/003* (2013.01); *H02K 7/1166* (2013.01); *H02K 11/01* (2016.01); *H02K 11/022* (2013.01); *H02K 11/026* (2013.01); *H02K 11/40* (2016.01)

(58) Field of Classification Search
CPC ...... H02K 11/0005; H02K 11/01; H02K 5/04; H02K 7/003; H02K 7/1166; H02K 11/022; H02K 11/026; H02K 11/40
USPC .......................................................... 310/72
See application file for complete search history.

(56) References Cited

U.S. PATENT DOCUMENTS

| | | | |
|---|---|---|---|
| 2002/0050762 | A1 | 5/2002 | Tang |
| 2010/0215491 | A1* | 8/2010 | Mockridge ......... F04D 29/0563 415/229 |

(Continued)

FOREIGN PATENT DOCUMENTS

JP 2002-276681 A 9/2002

*Primary Examiner* — Jianchun Qin
(74) *Attorney, Agent, or Firm* — Muncy, Geissler, Olds & Lowe, P.C.

(57) ABSTRACT

An electric motor includes a stator and a rotor. The stator includes a motor housing with an open end and an end cover mounted to the open end. The rotor includes a rotor shaft that extends through the end cover. The end cover includes a bearing that supports the rotor shaft. The rotor shaft and motor housing are made of an electrically conductive material and are electrically connected with each other. The motor housing, end cover, bearing and rotor shaft cooperatively form an electromagnetic shield suppressing electromagnetic interference generated by the motor. Optionally, the rotor shaft drives a coaxial worm shaft of a gearbox by an insulating member, which further suppresses electromagnetic interference.

6 Claims, 7 Drawing Sheets

(56) References Cited

U.S. PATENT DOCUMENTS

2011/0193446 A1* 8/2011 Orlowski ............... H01R 39/64
 310/232
2014/0265746 A1* 9/2014 Muehlbauer ....... H02K 11/0089
 310/68 R

* cited by examiner

MOTOR AND ACTUATOR

CROSS REFERENCE TO RELATED APPLICATIONS

This non-provisional patent application claims priority under 35 U.S.C. § 119(a) from Patent Application No. 201410252289.6 filed in The People's Republic of China on Jun. 9, 2014, the entire contents of which are hereby incorporated by reference.

FIELD OF THE INVENTION

This invention relates to an electric motor and in particular, to a motor and an actuator having the motor.

BACKGROUND OF THE INVENTION

Electric motors having a commutator and brushes generate electromagnetic radiation by the switching of current that occurs as the brushes slide over the commutator. This electromagnetic radiation may cause electromagnetic interference with sensitive devices located nearby. Actuators incorporating electric motors are frequently used in vehicles to control the position of movable elements such as air flaps in an air conditioning system. Electromagnetic radiation from the motors of these actuators is required to be kept below desired levels to reduce the effects of electromagnetic interference on nearby computer systems. Currently, a filtering circuit is used to suppress the electromagnetic radiation but these components are expensive and as the desired level of allowable electromagnetic interference continues to decrease the cost of the filtering circuit increases to ensure electromagnetic compatibility.

SUMMARY OF THE INVENTION

Hence there is a desire for electric motors and actuators with increased electromagnetic compatibility.

Accordingly, in one aspect thereof, the present invention provides a motor comprising a stator and a rotor, the stator comprising a motor housing with an open end and an end cover mounted to the open end of the motor housing, the rotor comprising a rotor shaft through which the rotor is rotatably mounted to the stator, and a bearing mounted to the end cover for supporting the rotor shaft, wherein the rotor shaft and the motor housing are made of an electrically conductive material, and the rotor shaft and the motor housing are electrically connected with each other.

Preferably, the bearing is made of an electrically conductive material, and the rotor shaft is electrically connected to the motor housing by the bearing and a conductor connected between the bearing and the motor housing.

Preferably, the rotor shaft, bearing, end cover and motor housing cooperatively define a closed chamber.

Preferably, the rotor comprises a rotor core and a commutator mounted to the rotor shaft, the stator comprises a brush assembly, the brush assembly is mounted adjacent the open end and located within the closed chamber.

Preferably, the brush assembly comprises a filtering element located in the closed chamber.

Preferably, the end cover is made of an insulating material, and the bearing is electrically connected to the motor housing by an electrically conductive layer disposed over the end cover or an electrically conductive member mounted to the end cover.

Preferably, the end cover is made of an electrically conductive material, and the rotor shaft is electrically connected to the motor housing by the bearing and the end cover.

Preferably, one of the end cover and the motor housing comprises a protruding connecting tab, and the other of the end cover and the motor housing comprises a receiving portion for receiving the connecting tab to achieve electrical connection therebetween.

Preferably, the bearing is one of an electrically conductive sleeve bearing and an electrically conductive rolling bearing.

According to a second aspect, the present invention provides an actuator comprising a motor and a gearbox connected to the motor, the gearbox comprising a worm wheel and a worm shaft with a worm, the worm wheel meshed with the worm, the motor comprising a stator and a rotor, the stator comprising a motor housing with an open end and an end cover mounted to the open end of the motor housing, the rotor comprising a rotor shaft connected with the worm shaft, and a bearing mounted to the end cover for supporting the rotor shaft, wherein the rotor shaft and the motor housing are made of an electrically conductive material, and the rotor shaft and the motor housing are electrically connected with each other.

Preferably, the worm shaft is made of an electrically conductive material, and the worm shaft is electrically insulated from and coaxially connected with the rotor shaft by an insulating member.

Preferably, the insulating member is disposed on one side of the end cover adjacent the worm shaft.

According to a third aspect, the present invention provides an actuator comprising a motor and a gearbox connected to the motor, the gearbox comprising a worm wheel and a worm shaft with a worm, the worm wheel being in mesh with the worm, the motor comprising a rotor shaft connected with the worm shaft, wherein the worm shaft and the rotor shaft are made of an electrically conductive material and are electrically insulated from each other, the worm shaft is coaxially connected with the rotor shaft by an insulating member to rotate with the rotor shaft.

Preferably, one end of the rotor shaft adjacent the worm shaft comprises a connecting head connected with the insulating member, and one end of the worm shaft adjacent the rotor shaft comprises a connecting head connected with the insulating member.

Preferably, both connecting heads are non-circular.

Preferably, the one end of the rotor shaft adjacent the worm shaft and the one end of the worm shaft adjacent the rotor shaft are isolated from each other by an air gap or a portion of the insulating member.

Preferably, one end of the rotor shaft adjacent the worm shaft comprises a flat portion, a reinforcement member is mounted to the flat portion, and the reinforcement member is fixedly connected to the insulating member.

Preferably, the reinforcement member has a through hole in a central portion thereof for receiving the flat portion, at least two projections extend outwardly from an outer periphery of the reinforcement member, the insulating member comprises at least two position-limiting blocks alternately arranged with the projections.

Preferably, the insulating member has a connecting hole at a central portion thereof, one end of the worm shaft comprises a connecting head, multiple axial ribs are formed on an outer periphery of the connecting head, and the multiple axial ribs are fixedly connected in the connecting hole.

In view of the foregoing, the motor housing, end cover, bearing and rotor shaft of the motor cooperatively form an electromagnetic shield which effectively suppresses the electromagnetic interference of the motor thus increasing the electromagnetic compatibility of the motor. The rotor shaft of the motor and the worm shaft of the gearbox may be coaxially connected by an insulating member, which further increases the electromagnetic compatibility of the motor by reducing electromagnetic interference radiated by the rotor shaft.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Referring to FIG. 1 to FIG. 4, a actuator 20 in accordance with a first embodiment of the present invention includes a gearbox 30 and a motor 40. The gearbox 30 includes a gear housing 31, a worm wheel 33 and a worm shaft 81 disposed in the gear housing 31, and an output gear 34. The output gear 34 rotates coaxially along with the worm wheel 33. A worm is mounted on or formed with the worm shaft 81 and meshes with the worm wheel 33. A bearing 35 is mounted in the gear housing 31 for supporting the worm shaft 81.

Figure 1:
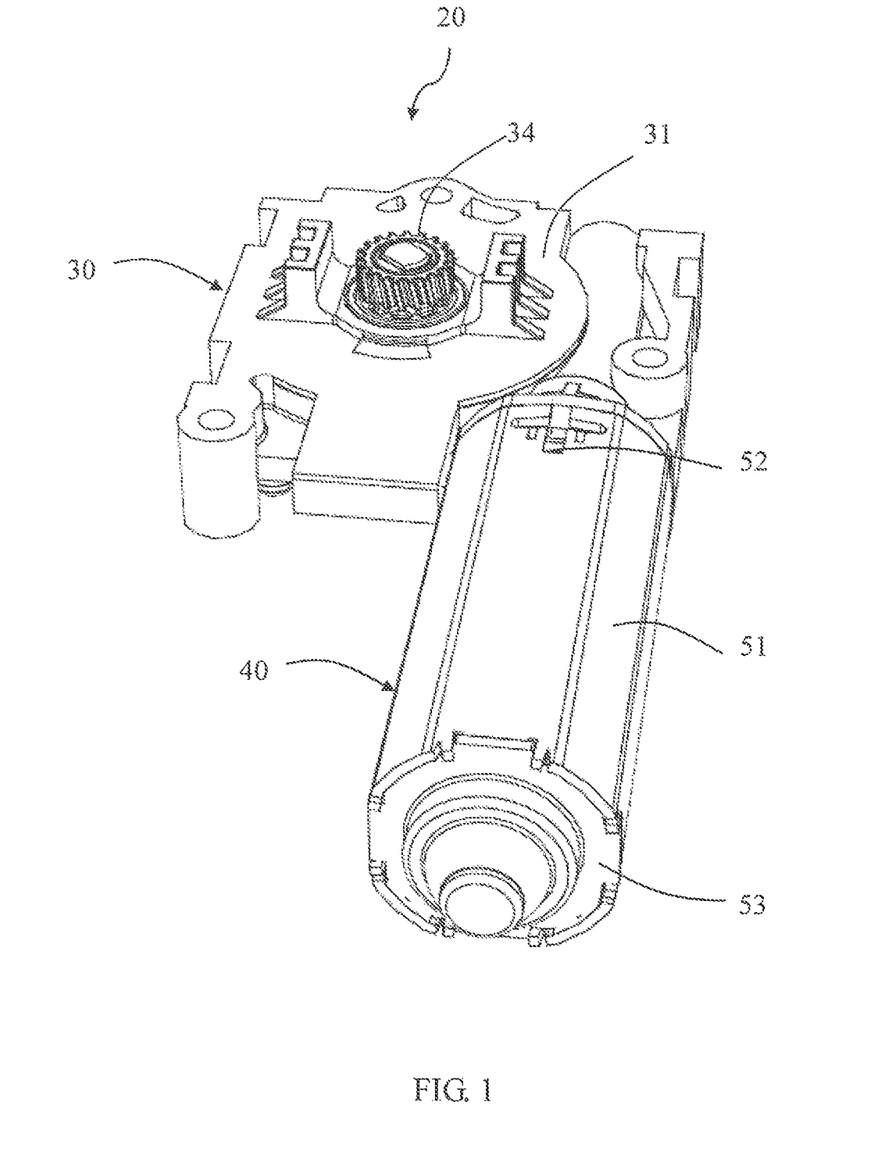
FIG. 1 illustrates an actuator according to a first embodiment of the present invention.
Figure 2:
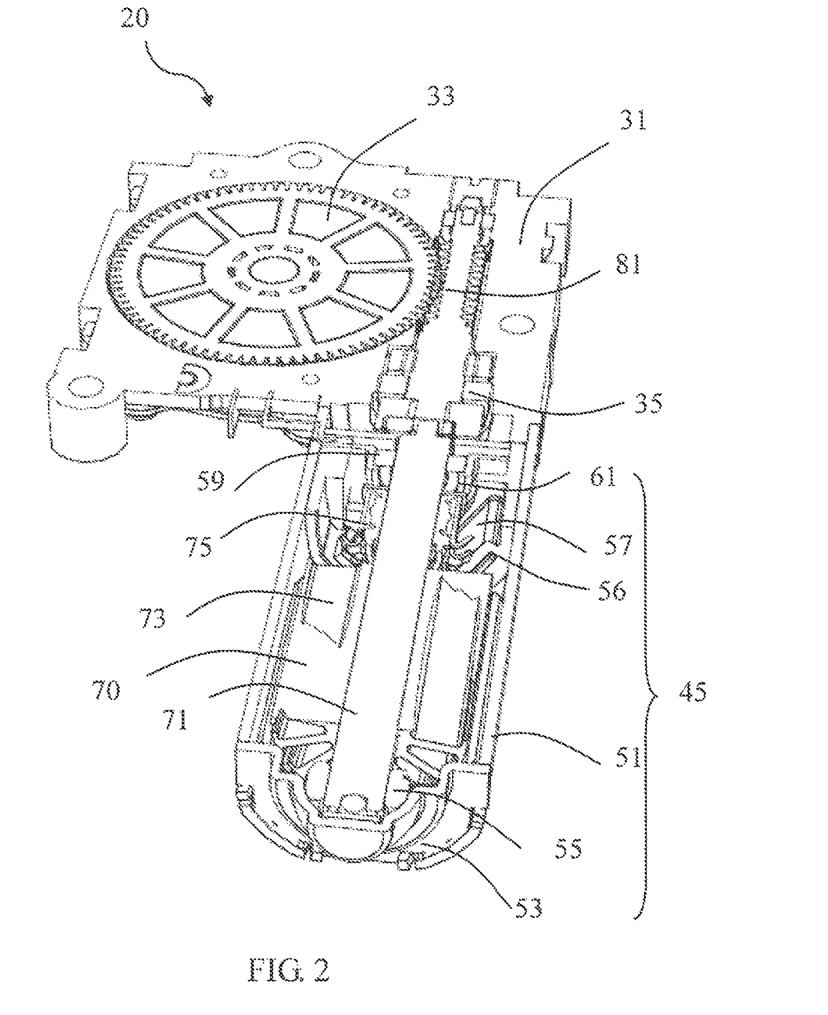
FIG. 2 is a sectional view of the actuator of FIG. 1.

The motor 40 includes a stator 45 and a rotor 70. The stator 45 includes a motor housing 51, an end cover 53 mounted to one end of the motor housing 51 to enclose an opening of the motor housing 51, permanent magnets (not shown) mounted to an inner surface of the motor housing 51, a brush assembly and an end cover 61 mounted to another open end of the motor housing 51. The rotor includes a rotor shaft 71, a rotor core 73 and a commutator 75 fixed to the rotor shaft 71, and rotor windings (not shown) wound around teeth of the rotor core 73. The brush assembly includes a brush card or brush holder 56 and at least two brushes 57 supported by the brush holder 56 and arranged to make sliding contact the commutator 75. Bearings 55, 59 are respectively mounted in the end covers 53, 61, for supporting the rotor shaft 71. The rotor is rotatably mounted to the stator 45 through the bearings. Rotating the rotor causes the worm shaft 81 to rotate coaxially with the rotor shaft 71 to achieve an output with reduced speed by means of the worm wheel 33 and the output gear 34.

In this embodiment, the motor housing 51 and the end covers 53, 61 are made of an electrically conductive material. The end cover 61 forms a bearing seat or bearing holder for mounting of the bearing 59. The bearing 59 is made of an electrically conductive material (e.g. copper). Therefore, the rotor shaft 71 is electrically connected with the motor housing 51 through the bearing 59 and end cover 61. As such, the motor housing 51, end cover 53, end cover 61 and rotor shaft 71 cooperatively define a closed chamber. The closed chamber acts as an electromagnetic shield which effectively prevents electromagnetic radiation produced by the brush assembly, rotor windings and commutator 75 inside the motor interfering with external devices. Preferably, during use, the electromagnetic compatibility (EMC) of the actuator 20 may be further increased by grounding of the motor 40.

In this embodiment, the brush assembly is located within the electromagnetic shield, such that the electromagnetic interference of the brush assembly with external devices during current reversal can be reduced or avoided. In this case, filtering elements such as capacitors or inductors that are mounted to the brush assembly are also located within the electromagnetic shield.

Figure 4:
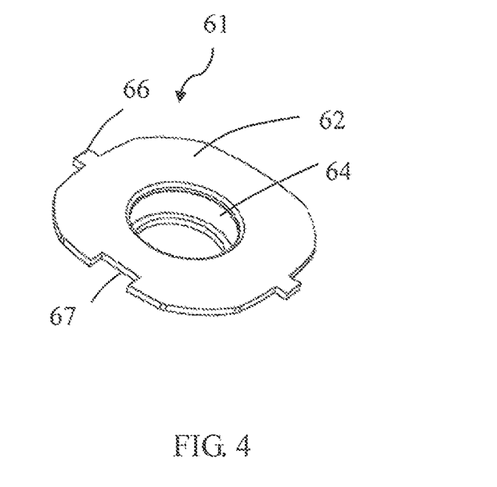
FIG. 4 illustrates a bearing seat for the rotor of FIG. 3.

Referring to FIG. 4, in this embodiment, the end cover 61 includes a cover body 62. The cover body 62 is recessed at a central portion to form an axially-extending cylindrical flange 64. The cylindrical flange 64 forms the bearing seat. Connecting tabs 66 extend outwardly from an outer edge of the cover body 62. Correspondingly, the motor housing 51 of the motor includes receiving portions 52 (e.g. through holes, slots or notches) that receive the connecting tabs 66 to achieve electrical connection between the motor housing 51 and the end cover 61. The outer edge of the cover body 62 may also form a cutout 67 for engaging with the brush holder 56 of the brush assembly in a recess-protrusion engagement manner for facilitating positioning and mounting of the end cover 61.

In this embodiment, the bearing 59 is implemented as a sleeve bearing (also referred to as oil-impregnated bearing). While the rotor shaft 71 is not inference-fit within the inner hole of the sleeve bearing and there is a small clearance between the sleeve bearing and the rotor shaft 71, it is noted, however, that the rotor shaft 71 is supported by and thus establishes electrical connection with the sleeve bearing 59 at any time. Therefore, the implementation of the bearing 59 as the sleeve bearing does not affect the electrical connection between the rotor shaft 71 and the motor housing 51.

It is also to be understood that the bearing 59 may also be implemented as a rolling bearing such as a ball bearing. In this case, the rotor shaft 71 is interference-fit with an inner ring of the rolling bearing to establish the electrical connection therebetween. An electrical connection between the inner ring and an outer ring of the rolling bearing is established through rolling elements such as steel balls. The outer ring of the rolling bearing is interference-fit with the bearing seat of the end cover to establish an electrical connection therebetween.

In this embodiment, the end cover 61 is made of electrically conductive material, which acts as a conductor electrically connecting the bearing 59 and the motor housing 51.

Alternatively, the end cover 61 may be made of an insulating material (e.g. plastic), and the bearing 59 and motor housing 51 are electrically connected by an electrically conductive member mounted to the end cover 61 or an electrically conductive connecting layer (e.g. a copper foil layer) disposed over the end cover 61.

Figure 3:
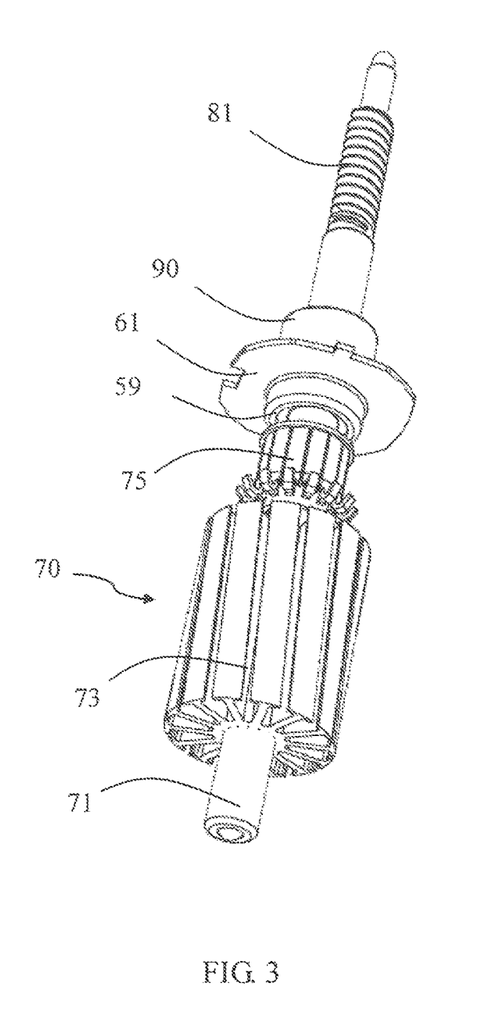
FIG. 3 illustrates a rotor and worm shaft of the actuator of FIG. 1.
Figure 5:
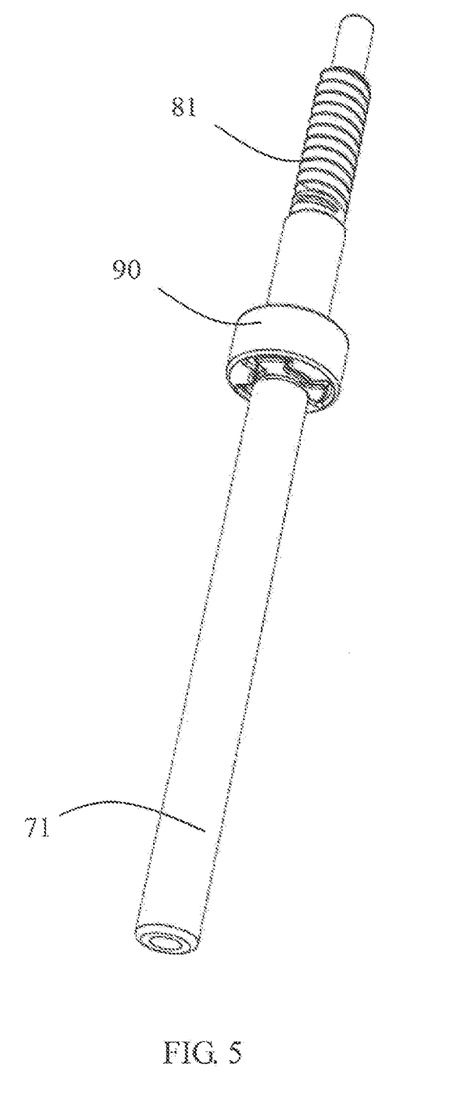
FIG. 5 illustrates a rotor shaft and worm shaft of the actuator.
Figure 11:
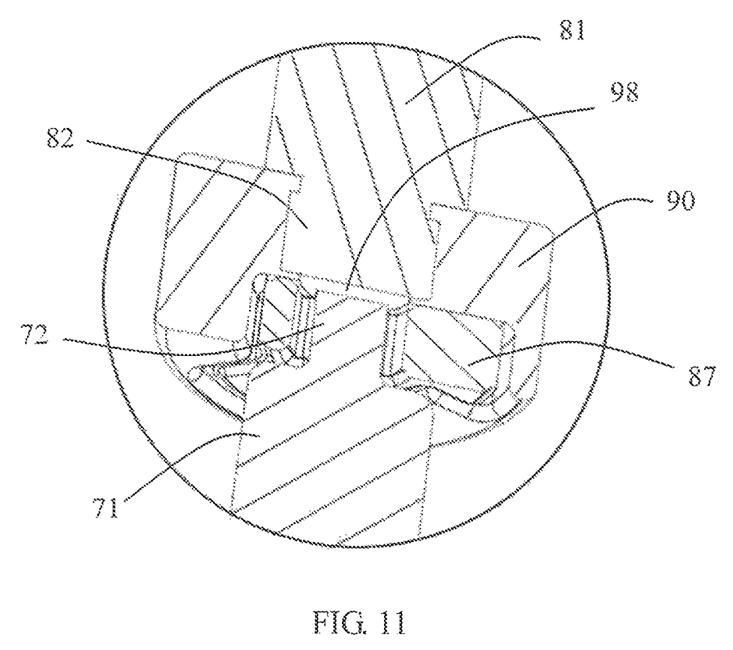
FIG. 11 is a partial, enlarged view of FIG. 6.

Referring to FIG. 3, FIG. 5 and FIG. 11, in this embodiment, the worm shaft 81 and rotor shaft 71 are made of a metal material. The worm shaft 81 and the rotor shaft 71 are coaxially connected through an insulating member 90, such that the worm shaft 81 rotates along with the rotor shaft 71. Because the worm shaft 81 is electrically insulated from the rotor shaft 71, conduction of the electromagnetic interference from the rotor shaft 71 to the worm shaft 81 is reduced or eliminated, thus further increasing the EMC of the actuator.

Preferably, the location where the rotor shaft 71 is insulated from the worm shaft 81 is located outside the electromagnetic shield and close to the end cover 61. As such, the electromagnetic shield is substantially closed, and most parts of the rotor shaft 71 is located within the electromagnetic shield.

In this embodiment, one end of the rotor shaft 71 adjacent the worm shaft includes a flat portion for connecting with a reinforcement member 87. The reinforcement member 87 has a through hole 88 at a central portion thereof for receiving the flat portion 72. Three projections 89 extend outwardly from a circumferential periphery of the reinforcement member 87. One end of the worm shaft 81 close to the rotor shaft forms a connecting head 82 with a reduced outer diameter. Multiple axial ribs 83 are formed on an outer periphery of the connecting head 82. The insulating member 90 preferably is made of Bakelite and is connected with the reinforcement member 87 and the connecting head 82 of the worm shaft to coaxially fix the rotor shaft 71 and the worm shaft 81 to each other. In this embodiment, the insulating member 90 includes a cylindrical main body 91, three position-limiting blocks 95 at one side of the main body 91, and an annular body 97 surrounding the three position-limiting blocks 95. A connecting hole 93 is formed in a central portion of the main body 91. The connecting head 82 of the worm shaft 81 is interference-fit in the connecting hole 93. The ribs 83 on the outer periphery of the connecting head 82 reinforce the connection between the connecting head 82 and the main body 91. The reinforcement member 87 is mounted in the annular body 97 of the insulating member 90, with the three position-limiting blocks 95 of the insulating member 90 alternately arranged with the three projections 89 of the reinforcement member 87 for the transmission of the driving force. An outer circumferential surface of the annular body 97 is flush with an outer circumferential surface of the main body 91, such that the insulating member 90 has a continuous smooth surface which reduces rotational resistance.

In this embodiment, an axial length of the connecting head 82 of the worm shaft 81 is less than a depth of the connecting hole 93 of the main body 91, such that a gap 98 is formed between the rotor shaft 71 and the worm shaft 81 (FIG. 11). This gap 98 ensures that the worm shaft 81 and the rotor shaft 71 are electrically insulated from each other.

Figure 12:
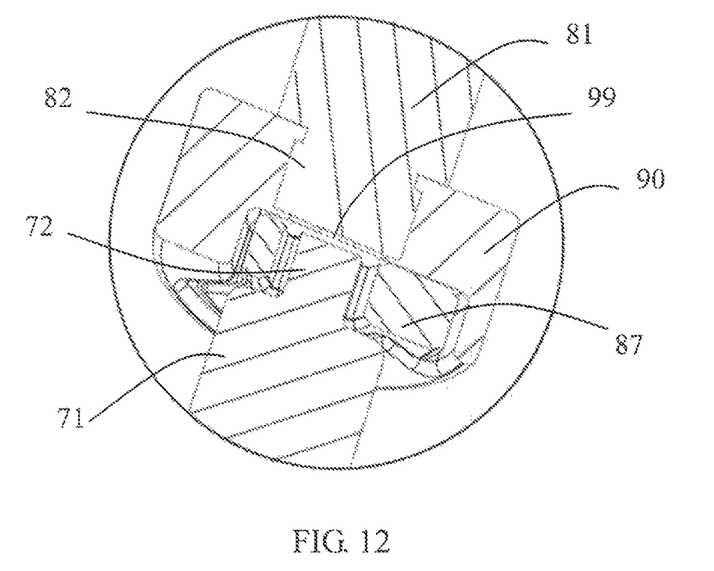
FIG. 12 is a partial, sectional view of the rotor shaft and worm shaft according to another embodiment of the present invention.

Alternatively, as shown in FIG. 12, the main body 91 may have a bottom portion 99 at one end of the central connecting hole 93 adjacent the rotor shaft 71. This bottom portion 99 is integrally formed with the insulating member 90 for isolating the rotor shaft 71 from the worm shaft 81, thereby ensuring electrical isolation between the rotor shaft 71 and the worm shaft 81.

It is noted that the connecting head 82 of the worm shaft 81 should not be limited to the shape as described above. Rather, any shape of the connecting head 82 is possible as long as it enables the coaxial rotation of the insulating member 90 and the worm shaft 81. Similarly, the end of the rotor shaft 71 close to the worm shaft is not intended to be limited to the structure having the flat portion 72.

It is also noted that the reinforcement member 87 is used mainly to reinforce the connection between the rotor shaft 71 and the insulating member 90. Therefore, the reinforcement member 87 may be omitted in another embodiment. In addition, the flat portion 72 of the rotor shaft 71 is used mainly to achieve torque transfer to prevent relative movement. Therefore, the flat portion of the rotor shaft 71 may be replaced with another non-circular head such as a square head or a hexagonal head.

Figure 6:
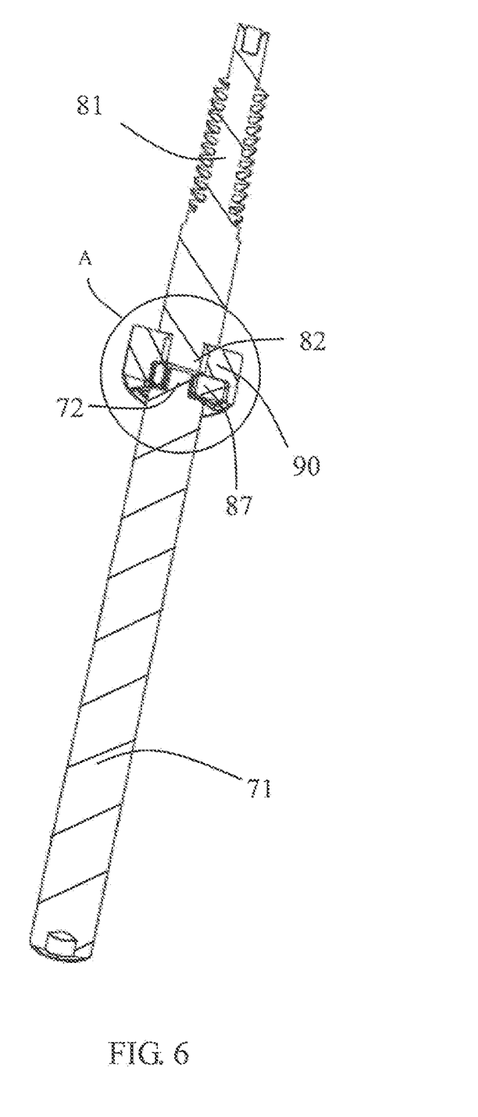
FIG. 6 is a sectional view of the rotor shaft and worm shaft of FIG. 5.
Figure 7:
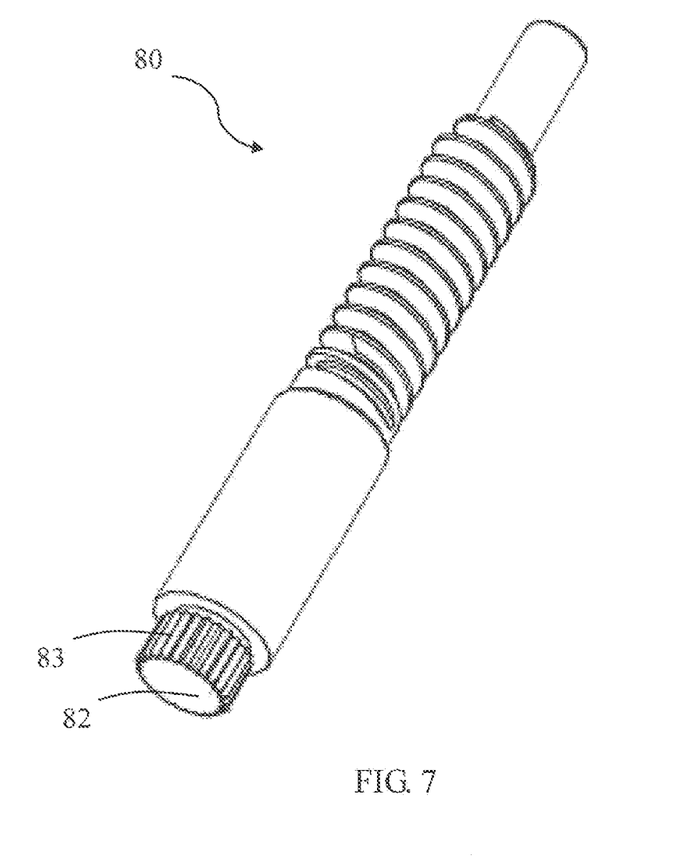
FIG. 7 illustrates the worm shaft.
Figure 8:
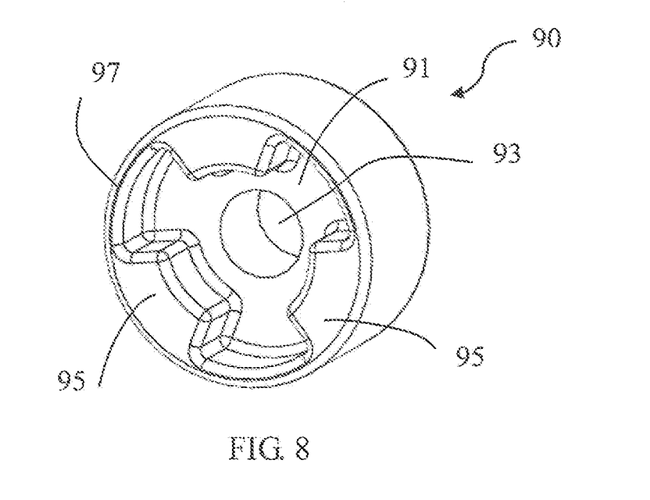
FIG. 8 illustrates an insulating member for connecting the worm shaft to the rotor shaft.
Figure 9:
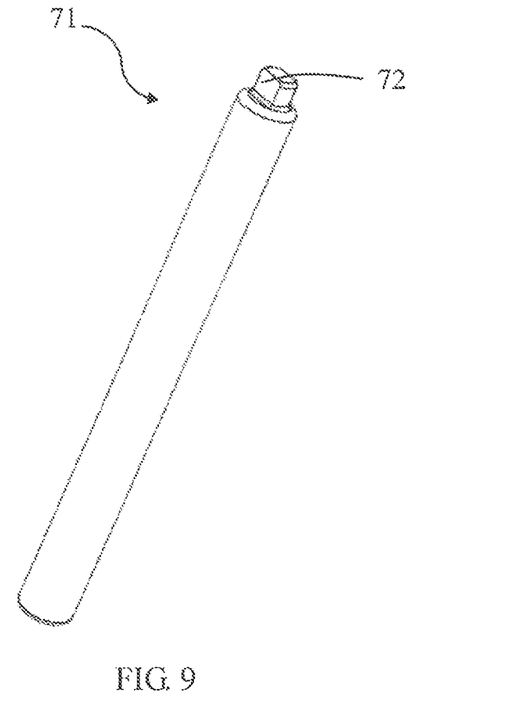
FIG. 9 illustrates the rotor shaft.
Figure 10:
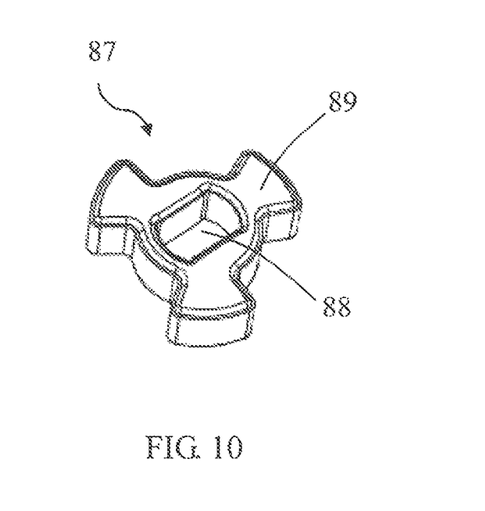
FIG. 10 illustrates a reinforcement member mounted to the end of the rotor shaft adjacent to the worm shaft.

It is also noted that the design of the insulating connection between the rotor shaft and worm shaft as shown in FIG. 5 to FIG. 7 may be also applied in another type of actuator.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. A motor comprising a stator and a rotor, the stator comprising a motor housing with an open end and an end cover mounted to the open end of the motor housing, the rotor comprising a rotor shaft through which the rotor is rotatably mounted to the stator, and a bearing mounted to the end cover for supporting the rotor shaft,
    wherein the rotor shaft and the motor housing are made of an electrically conductive material, and the rotor shaft and the motor housing are electrically connected with each other;
    wherein the end cover is made of an insulating material, and the bearing is electrically connected to the motor housing by an electrically conductive layer disposed over the end cover or an electrically conductive member mounted to the end cover.

2. The motor of claim 1, wherein the bearing is made of an electrically conductive material, and the rotor shaft is electrically connected to the motor housing by the bearing and a conductor connected between the bearing and the motor housing.

3. The motor of claim 1, wherein the rotor shaft, bearing, end cover and motor housing cooperatively define a closed chamber.

4. The motor of claim 3, wherein the rotor comprises a rotor core and a commutator mounted to the rotor shaft, the stator comprises a brush assembly, the brush assembly is mounted adjacent the open end and located within the closed chamber.

5. The motor of claim 4, wherein the brush assembly comprises a filtering element located in the closed chamber.

6. The motor of claim 1, wherein the bearing is one of an electrically conductive sleeve bearing and an electrically conductive rolling bearing.

\* \* \* \* \*